United States Patent
Zhao et al.

(10) Patent No.: US 7,990,894 B2
(45) Date of Patent: *Aug. 2, 2011

(54) METHOD FOR IMPLEMENTING DISTRIBUTION OF LINK STATE INFORMATION IN AN OPTICAL NETWORK

(75) Inventors: Min Zhao, Shenzhen (CN); Junjie Feng, Shenzhen (CN); Li Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,400

(22) Filed: Dec. 22, 2009

(65) Prior Publication Data

US 2010/0098416 A1   Apr. 22, 2010

Related U.S. Application Data

(63) Continuation of application No. 10/593,934, filed as application No. PCT/CN2006/000247 on Feb. 21, 2006, now Pat. No. 7,668,113.

(30) Foreign Application Priority Data

Feb. 21, 2005   (CN) .......................... 2005 1 0008447

(51) Int. Cl.
*H04L 12/28* (2006.01)

(52) U.S. Cl. ......... 370/254; 370/410; 709/220; 709/238

(58) Field of Classification Search .................. None
See application file for complete search history.

(56) References Cited

U.S. PATENT DOCUMENTS

| 7,301,911 B2 | 11/2007 | Mack-Crane et al. |
| 7,324,453 B2 | 1/2008 | Wu et al. |
| 7,668,113 B2 * | 2/2010 | Zhao et al. .................... 370/254 |
| 2002/0126344 A1 | 9/2002 | Wu et al. |
| 2003/0090996 A1 * | 5/2003 | Stewart ......................... 370/225 |
| 2003/0103449 A1 | 6/2003 | Barsheshet et al. |
| 2003/0172362 A1 * | 9/2003 | Mack-Crane et al. .......... 716/12 |
| 2004/0088429 A1 * | 5/2004 | Luo ................................. 709/232 |
| 2004/0120705 A1 * | 6/2004 | Friskney et al. ................... 398/5 |
| 2004/0193728 A1 | 9/2004 | Doshi et al. |

FOREIGN PATENT DOCUMENTS

| CA | 2 453 079 A1 | 11/2004 |
| CN | 1431797 A | 7/2003 |
| CN | 1494270 A | 5/2004 |
| CN | 1503532 A | 6/2004 |

OTHER PUBLICATIONS

Kompella et al., OSPF Extensions in Support of Generalized MPLS, Feb. 2001, Network Working Group.

* cited by examiner

*Primary Examiner* — Daniel J Ryman
*Assistant Examiner* — Brian Roberts
(74) *Attorney, Agent, or Firm* — Leydig, Voit & Mayer, Ltd.

(57) ABSTRACT

A method for implementing distribution of link state information in an optical network includes: determining information of each link protection attribute section included in a Traffic Engineering (TE) link; carrying the information of each link protection attribute section in a customized TLV, respectively; distributing the TLV in the optical network via Traffic Engineering Link State Advertisement (TE LSA). With this invention, all the link state information such as multiple kinds of protection types included in one TE link can be carried in the customized TLV to distribute. Therefore, in the implementation of this invention, one TE link corresponding to one optical fiber can be configured with multiple kinds of protection types.

10 Claims, 1 Drawing Sheet

METHOD FOR IMPLEMENTING DISTRIBUTION OF LINK STATE INFORMATION IN AN OPTICAL NETWORK

CROSS-REFERENCE TO RELATED APPLICATIONS

This application is a continuation of U.S. patent application Ser. No. 10/593,934, filed Feb. 21, 2006, which is the national stage of International Patent Application No. PCT/CN2006/000247, filed Feb. 21, 2006, which claims priority to Chinese Patent Application No. 200510008447.4, filed Feb. 21, 2005, all of which are hereby incorporated by reference herein in their entireties.

FIELD OF THE INVENTION

The present invention relates to optical network communication, and more particularly to a method for implementing distribution of link state information in an optical network.

BACKGROUND OF THE INVENTION

Open Shortest Path First (OSPF) protocol is a routing protocol that is commonly used in intelligent optical networks. Each router which runs OSPF protocol distributes its local link state information throughout the Autonomous System by flooding, and ultimately every participating OSPF router can obtain all the link state information of the whole Autonomous System's topology, and all the OSPF routers have the same link state database.

The flooding of OSPF link information is implemented via various Link State Advertisements (LSAs). The standard OSPF LSAs are: Router-LSAs, Network-LSAs, Area Border Router-Summary-LSAs, Autonomous System Boundary Router-Summary-LSAs, AS-external-LSAs, etc. In order to meet the requirements of Traffic Engineering (TE), OSPF extension protocol is used to extend the standard LSA, i.e., by using Type 10 Opaque LSA for releasing related link information, which is called Traffic Engineering Link State Advertisement (TE LSA).

The TE LSA, which is an opaque LSA, has two kinds of top-level TLVs (Type/Length/Value): Router Address TLV and Link TLV. Wherein, the Link TLV mainly describes the link properties of Traffic Engineering (TE) and defines standard sub-TLVs numbered 1 to 16, i.e., secondary TLVs, which include Link Type, Link ID, Local interface IP address, Unreserved bandwidth, Link Protection Type, Shared Risk Link Group, Interface Switching Capability Descriptor, etc; wherein, the link protection type is No. 14 sub-TLV.

According to the IETF definition, the protection type of the links in an automatic switching optical network includes Extra Traffic, Unprotected, Shared, Dedicated 1:1, Dedicated 1+1, Enhanced, etc. When an optical fiber is configured with Multiplex Section Protection (MSP), protection types of channels in the fiber can be categorized into three types: Enhanced, Unprotected and Extra Traffic; that is, protection types of different channels in an optical fiber can be different from each other, so it is inappropriate for a fiber link to define only one protection type.

Presently, when an optical interface is configured with MSP, the links for the bidirectional shared multiplex section can be divided into three TE links of different attributes: enhanced TE link, extra traffic TE link and unprotected TE link. In this way, the protection types of all the bandwidth resource for each TE link are identical. The three TE links generate LSAs to be flooded respectively.

It can be seen from the above mentioned representations:

(1) when there is traffic on a link, a multiplex section can not be dynamically configured, modified or deleted in this link, because configuring, modifying or deleting the multiplex section can result in regeneration of the TE link index for the optical interface. For example, if no multiplex section is configured initially, there exists an unprotected TE link in the optical interface; when multiplex sections are configured, the original TE link is deleted and then three new TE links are generated in accordance with the new configuration. In this way, the meaning of the link TE index for the current traffic stored in signaling has changed, which may likely cause the index to not relate to the original TE link.

(2) one optical fiber is represented by three TE links, resulting in large number of TE links and much flooded information, which increases the burden of the network.

SUMMARY OF THE INVENTION

The present invention aims to provide a method for implementing distribution of link state information in an optical network including the steps of: (1) determining information of each link protection attribute section included in a Traffic Engineering (TE) link; (2) carrying the information of each link protection attribute section included in the TE link in a customized Type Length Value (TLV), respectively; (3) distributing the TLV of Traffic Engineering link in the optical network via Traffic Engineering Link State Advertisement (TE LSA).

The step of determining information of each link protection attribute section included in a TE link further includes, in an embodiment, the step of: determining the number of link protection attribute section structures for the TE Link and information of each link protection attribute section carried in each link protection attribute section structure, in accordance with the subscriber configuration on the link.

The information of each link protection attribute section includes: protection type of the section and/or information of bandwidth resource occupied by the section.

The step of carrying the information of each link protection attribute section included in the TE link in a customized TLV respectively includes the step of: carrying the information of each link protection attribute section on the TE link in a field of link protection attribute section structure of the customized TLV.

In an embodiment of the present invention, the customized TLV further includes: (1) a field for the number of link protection attribute section structures, which is used to carry the number of the link protection attribute section structures divided from bandwidth resource in accordance with the subscriber configuration on the link; (2) a field for the offset of link protection attribute section structures, which is used to carry an offset from the start of TLV structure to the link protection attribute section information; wherein an offset pointer points to link protection attribute section structure sequence which is used to carry the information of each link protection attribute section.

The section protection types include: Extra, Unprotected, Shared, Dedicated 1:1, Dedicated 1+1 and Enhanced.

The information for bandwidth resource occupied by the section includes: the minimum bandwidth supported by the section and bandwidth resource occupied by the section.

It can be seen from the technical solution according to an aspect of the present invention that it effectively solves the problem associated with one TE link configured with multiple kinds of protection types, and can be well used when one TE link is configured with multiple kinds of protection types, such as multiplex section, span protection, etc. The protection attribute of the TE link is transferred from link level to each protection attribute section, and the protection attribute in the protection attribute section structure and the information of section bandwidth resource are encapsulated into a customized TLV of the TE link, and the TLV is flooded through No. 10 opaque LSA in the whole network, and therefore one TE-link can provide the bandwidth of multiple kinds of protection ability.

In addition, with the method for distributing link state information according to an aspect of the present invention, link state information which would have been distributed through multiple TE LSAs heretofore can then be distributed through only one TE LSA so that the number of TE links used to distribute link state information can be decreased significantly, traffic flooded in the network is decreased greatly, and network performance is increased.

In the implementation of an aspect of the present invention, dynamically adding, modifying or deleting part of multiplex sections can be supported in case that there exists traffic in some multiplex sections.

DETAILED DESCRIPTION OF THE INVENTION

The core idea of the present invention is carrying the protection attribute section information in a customized secondary TLV and distributing the secondary TLV in an optical network, so as to flood various protection type information of TE links in an optical network with less traffic distribution.

An optical fiber is usually provided with multiple protection types, so that bandwidth resources of different parts are likely to have different protection attributes. Therefore, the protection attribute is no longer the attribute of the whole TE link and can no longer be represented by No. 14 secondary TLV.

Figure 1:
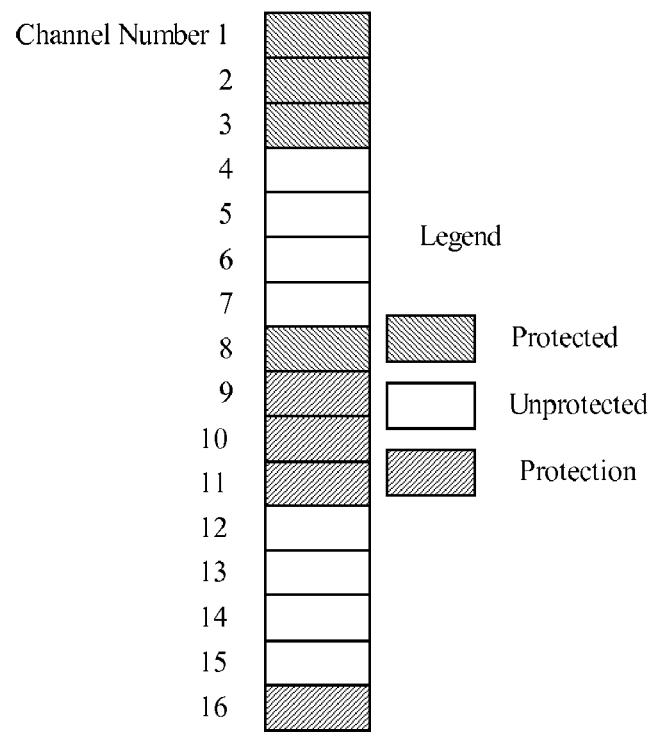
FIG. 1 is a schematic diagram illustrating the bandwidth resource protection state on the link of a two-fiber bidirectional multiplex section shared protection ring.

Referring to FIG. 1, the protection states of bandwidth resources on the link of a two-fiber bidirectional multiplex section shared protection ring are: protected bandwidth resource for channels 1~3 and channel 8, protecting bandwidth resource for channels 9~11 and channel 16 (it is assumed the minimum bandwidth granularity is VC4), and unprotected bandwidth resource for the rest channels. The bandwidth resource of the TE link is divided into several parts. Therefore, in an embodiment of the present invention, bandwidth resources with different protection attributes on a TE link are represented by section structure, and the protection attributes are transferred into each protection attribute section structure, and one TE link can have multiple section structures.

In order to better understand the present invention, hereinafter an embodiment of the present invention will be described in detail with reference to the attached drawings.

In the embodiment of the present invention, all link state information on TE links is placed in TE link TLVs to be flooded, wherein the information such as link type, link ID, local interface IP address, remote interface IP address, Unreserved bandwidth, Shared Risk Link Group and Interface Switching Capability Descriptor (link protection type is not included), etc, is located in a standard defined secondary TLV, and private information is placed in a customized secondary TLV.

The core of the method according to an embodiment of the present invention is adding two fields in the customized secondary TLV:

field for the number of link protection attribute section structures and field for the offset of link protection attribute section structures, wherein:

the field for the number of link protection attribute section structures is used to carry the number of link protection attribute section structures; the number of link protection attribute section structures is the number of different protection types in a whole TE link. Referring to FIG. 1, the number of link protection attribute section structures is 3.

The field for the offset of link protection attribute section structures is used to carry an offset of link protection attribute section structures; the offset of link protection attribute section structures is an offset from the TLV header to the link protection attribute section structure sequence; the protection attribute section structure sequence carries information of each link protection attribute section, such as protection type, section bandwidth resource, etc; the introduction of the design of offset pointer structure can facilitate representation of uncertain length sections.

An embodiment of the present invention utilizes the above extension field to carry the protection attribute information of the bandwidth resource with different protection types included in an optical fiber, so as to carry all the protection attribute information in the optical fiber in a secondary TLV and flood it in the network via TE LSA, achieving effective distribution of the link state information of TE links in the whole network.

Hereinafter the content information carried in the field of link protection attribute section structure in the present invention will be described in detail with reference to the attached drawings.

In an embodiment of the present invention, the link protection attribute section information in the field of each link protection attribute section structure includes: protection type of the section, bandwidth resource occupied by the section, etc; hereinafter the two kinds of section information will be described.

In the field of link protection attribute section structure, the protection types include: Extra Traffic, Unprotected, Shared, Dedicated 1:1, Dedicated 1+1 or Enhanced, etc. The traffic on the protected bandwidth resource is protected, as to two-fiber multiplex section protection ring, the protection type is "Shared"; as to 4-fiber MS-SPR, the protection type is "Enhanced." The protection attribute for unprotected bandwidth resource is "Unprotected." Protecting bandwidth resource can be used to carry extra traffic, so the protection attribute is "Extra Traffic". Referring to FIG. 1, channels 1~3 and channel 8 are protected bandwidth resources, so the corresponding protection attribute in protection attribute section structure is "Shared"; correspondingly, channels 9~11 and channel 8 are protecting bandwidth resources, so the corresponding protection attribute in protection attribute section structure is "Extra Traffic"; the protection attribute in protection attribute section structure for the rest channels of non-protected bandwidth resource is "Unprotected."

In the protection attribute section structure, the representation of the bandwidth resource includes two fields: the minimum bandwidth supported by the section (i.e., the minimum bandwidth granularity) and the bandwidth resource occupied by the section.

In order to make it to be understood clearly, the content information of each field in the protection attribute section structure according to an embodiment of the present invention will be described with reference to a specific example.

Referring to FIG. 1, part of the sections in the customized TLV is shown in Table 1.

TABLE 1

| TIV_type | QODM_LINK_TLV_TE_PARAMS |
|---|---|
| TIV_length | Length of the TLV, the value is filled up as needed |
| ... | |
| ... | |
| The number of link protection attribute sections | 3 |
| Header offset of link protection attribute section | Offset from the start of the TLV to the protection attribute section structure |

Table 2 shows the fields of the protection attribute section structure in the customized TLV.

TABLE 2

| Protection type of the first section | Shared |
|---|---|
| Minimum bandwidth of the first section | 155.520M |
| Bandwidth resource occupied by the first section | 622.080M |
| Protection type of the second section | Extra |
| Minimum bandwidth of the second section | 155.520M |
| Bandwidth resource occupied by the second section | 622.080M |
| Protection type of the third section | Unprotected |
| Minimum bandwidth of the third section | 155.520M |
| Bandwidth resource occupied by the third section | 1244.160M |

Figure 2:
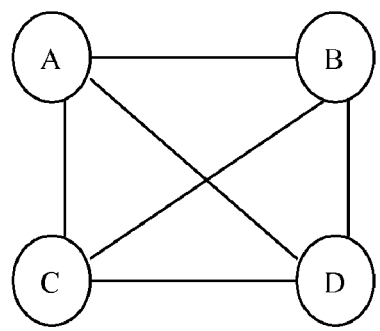
FIG. 2 is a schematic diagram illustrating a four-spot-connected network architecture.

The method according to an embodiment of the present invention can be also used to distribute link state information in span protection; referring to FIG. 2, in a four-spot-connected MESH network, it is assumed that signals transmitted by optical fiber between two network elements is STM-64, i.e., the bandwidth resources are 64 VC4s.

With span protection, if 42 VC4s thereof are configured as working channels, 21 VC4s are used as protecting channels (used to protect other links), and the rest one is a non-protected channel. In this case, if the optical fiber between A and B is disconnected, the traffic on the 42 VC4s thereof will go through the other two paths, wherein 21 VC4s go through the protecting channels of ACB, and the other 21 VC4s go through the protecting channels of ADB. It can be seen that in span protection, various protection types, rather than one, can be provided for one optical fiber. Therefore, for span protection, the object of the present invention can be also achieved by describing the protection attribute information using the protection attribute section structures according to an embodiment of the present invention, i.e., various protection types are provided for one TE link can include and the link state information on the TE link can be flooded in the network by less flooded traffic.

The above-mentioned embodiments of the present invention are preferable. The protective scope of the present invention is not limited to these embodiments. Any variation or substitution within the technical scope of the present invention, which can be easily worked out by those skilled in the art, should be fallen in the protective scope of the present invention as defined in the attached claims.

What is claimed is:

1. A method for implementing distribution of link state information in an optical network, comprising the steps of:
   determining information of each link protection attribute section included in a Traffic Engineering (TE) link; wherein the TE link is divided into multiple sections, the multiple sections of the TE link have multiple protection types, wherein each section of the TE link is configured with one of the multiple protection types, and each section of the TE link includes one or more channels;
   carrying the information of each link protection attribute section included in the TE link in a customized Type Length Value (TLV), respectively; and
   distributing the customized TLV in the optical network via Traffic Engineering Link State Advertisement (TE LSA).

2. The method for implementing distribution of link state information in an optical network according to claim 1, wherein the information of each link protection attribute section comprises:
   protection type of the link protection attribute section and/or information of a bandwidth resource occupied by the link protection attribute section.

3. The method for implementing distribution of link state information in an optical network according to claim 2, wherein the step of carrying the information of each link protection attribute section included in the TE link in a customized Type Length Value (TLV) respectively further includes the step of:
   carrying the information of each link protection attribute section on the TE link in a field of link protection attribute section structure of the customized TLV.

4. The method for implementing distribution of link state information in an optical network according to claim 1, wherein the step of carrying the information of each link protection attribute section included in the TE link in a customized Type Length Value (TLV) respectively further includes the step of:
   carrying the information of each link protection attribute section on the TE link in a field of link protection attribute section structure of the customized TLV.

5. The method for implementing distribution of link state information in an optical network according to claim 4, wherein the customized TLV further comprises:
   a field for the number of link protection attribute section structures, which is used to carry the number of the link protection attribute section structures divided from a bandwidth resource in accordance with a subscriber configuration on the TE link; and
   a field for an offset of link protection attribute section structures, which is used to carry an offset from the start of the customized TLV structure to the information of each link protection attribute section; wherein an offset pointer points to a link protection attribute section structure sequence which is used to carry the information of each link protection attribute section.

6. The method for implementing distribution of link state information in an optical network according to claim 5, wherein protection types of the bandwidth resource of one optical fiber include:
   Extra, Unprotected, Shared, Dedicated 1:1, Dedicated 1+1 and Enhanced.

7. The method for implementing distribution of link state information in an optical network according to claim 6, wherein information for bandwidth resource occupied by a section comprises:
   minimum bandwidth supported by the section and bandwidth resource occupied by the section.

8. The method for implementing distribution of link state information in an optical network according to claim 1, wherein the section protection types of the bandwidth resource of one optical fiber include two or more of the following protection types:

Extra, Unprotected, Shared, Dedicated 1:1, Dedicated 1+1 and Enhanced.

9. A method for implementing distribution of link state information in an optical network, comprising the steps of:

determining information of each link protection attribute section included in a Traffic Engineering (TE) link;

carrying the information of each link protection attribute section included in the TE link in a customized Type Length Value (TLV), respectively; and distributing the TLV in the optical network via Traffic Engineering Link State Advertisement (TE LSA);

wherein the step of determining information of each link protection attribute section included in a TE link further includes the step of:

determining the number of link protection attribute section structures for the TE Link and information of each link protection attribute section carried in each link protection attribute section structure, in accordance with a subscriber configuration on the TE link.

10. The method for implementing distribution of link state information in an optical network according to claim 9, wherein the step of carrying the information of each link protection attribute section included in the TE link in a customized Type Length Value (TLV) respectively further includes the step of:

carrying the information of each link protection attribute section on the TE link in a field of link protection attribute section structure of the customized TLV.

* * * * *